US008611956B2

(12) United States Patent
Bella et al.

(10) Patent No.: US 8,611,956 B2
(45) Date of Patent: Dec. 17, 2013

(54) JOINT IC CARD AND WIRELESS TRANSCEIVER MODULE FOR MOBILE COMMUNICATION EQUIPMENT

(75) Inventors: Valter Bella, Turin (IT); Claudio Borean, Turin (IT)

(73) Assignee: Telecom Italia S.p.A., Milan (IT)

( * ) Notice: Subject to any disclaimer, the term of this patent is extended or adjusted under 35 U.S.C. 154(b) by 1219 days.

(21) Appl. No.: 11/791,458

(22) PCT Filed: Nov. 25, 2004

(86) PCT No.: PCT/EP2004/013378
§ 371 (c)(1),
(2), (4) Date: Jan. 9, 2008

(87) PCT Pub. No.: WO2006/056220
PCT Pub. Date: Jun. 1, 2006

(65) Prior Publication Data
US 2008/0261656 A1 Oct. 23, 2008

(51) Int. Cl.
*H04B 1/38* (2006.01)

(52) U.S. Cl.
USPC .................. 455/558; 439/607.22; 379/211.05

(58) Field of Classification Search
USPC ........... 455/588; 379/114.15, 211.05, 357.01, 379/357.02, 433.09; 439/607.22; 902/26
See application file for complete search history.

(56) References Cited

U.S. PATENT DOCUMENTS

| 6,615,057 | B1 * | 9/2003 | Pettersson ...................... 455/558 |
| 7,402,047 | B2 * | 7/2008 | Nishizawa et al. ............. 439/60 |
| 2002/0016186 | A1 | 2/2002 | Chambon et al. | |
| 2004/0176071 | A1 * | 9/2004 | Gehrmann et al. ........... 455/411 |
| 2004/0180657 | A1 * | 9/2004 | Yaqub et al. ................... 455/558 |
| 2010/0275259 | A1 * | 10/2010 | Adams et al. .................... 726/19 |

FOREIGN PATENT DOCUMENTS

| CN | 1262850 | 8/2000 |
| EP | 0 820 178 A2 | 1/1998 |
| JP | 2000/172814 | 6/2000 |
| JP | 2000/315249 | 11/2000 |
| JP | 2002/222442 | 8/2002 |
| WO | WO 98/33343 | 7/1998 |
| WO | WO 01/80193 A1 | 10/2001 |
| WO | WO 01/95605 A1 | 12/2001 |
| WO | WO 2004/095365 | 11/2004 |

OTHER PUBLICATIONS

Anonymous, "Bluetooth enabled SIM-card", Research Disclosure, Kenneth Mason Publications, Westbourne, GB, vol. 439, No. 6, XP007127047, pp. 1-2, (Nov. 2000).

(Continued)

*Primary Examiner* — Nay A Maung
*Assistant Examiner* — Angelica M Perez
(74) *Attorney, Agent, or Firm* — Finnegan, Henderson, Farabow, Garrett & Dunner, L.L.P.

(57) ABSTRACT

An integrated circuit card for a mobile terminal incorporates a radio transceiver module intended for communications that do not pass through the mobile network. To allow using, for the chip of the IC card and the radio transceiver module, the same chips as would be used for conventional IC cards and transceivers not integrated together, the IC card further includes a finite state machine chip interconnecting the IC card chip and the chip(s) of the transceiver module so that they have access to the card contacts establishing connection between the card and the terminal.

24 Claims, 5 Drawing Sheets

(56) References Cited

OTHER PUBLICATIONS

IEEE Std 802.15.4, Part 15.4: Wireless Medium Access Control (MAC) and Physical Layer (PHY) Specifications for Low-Rate Wireless Personal Area Networks (LR-WPANs), IEEE Computer Society, pp. vi-viii, 107-110, (Oct. 1, 2003).

SIEP, Texas Instruments, "Project: IEEE P802.15 Working Group for Wireless Personal Area Networks (WPANs)", doc.: 802.15-01/046r1, pp. 1-55, (Jan. 2001).

* cited by examiner

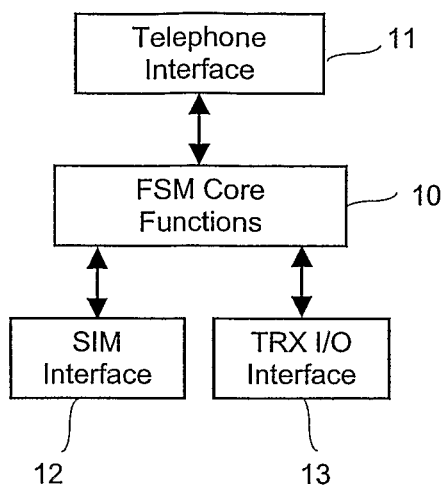
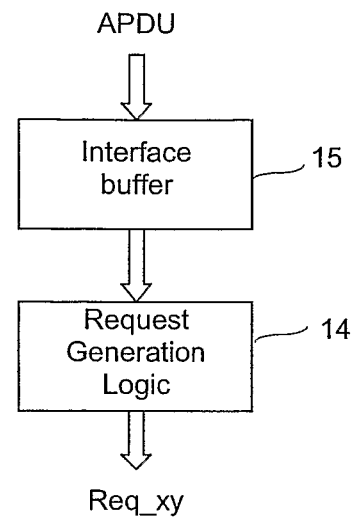
FIG. 3     FIG. 6
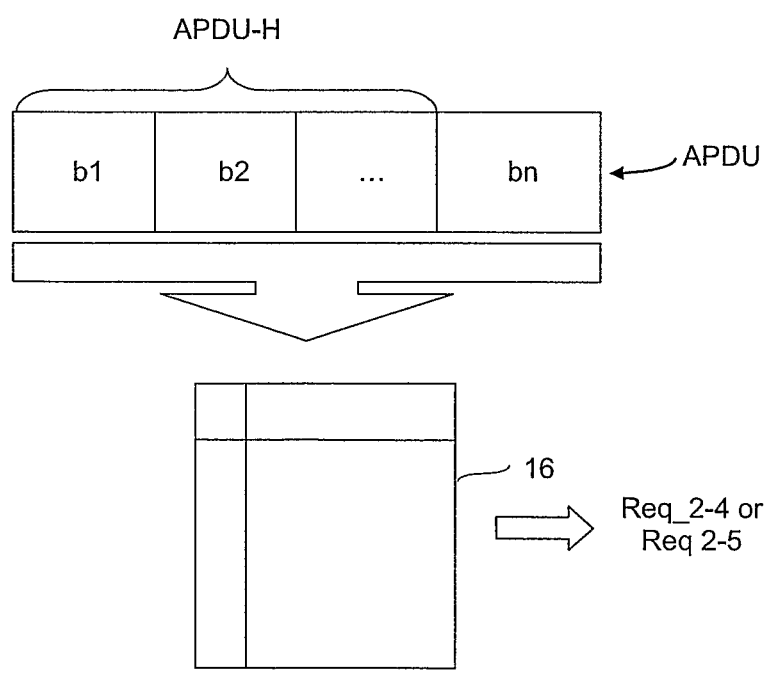
FIG. 7

JOINT IC CARD AND WIRELESS TRANSCEIVER MODULE FOR MOBILE COMMUNICATION EQUIPMENT

CROSS REFERENCE TO RELATED APPLICATION

This application is a national phase application based on PCT/EP2004/013378, filed Nov. 25, 2004, the content of which is incorporated herein by reference.

FIELD OF THE INVENTION

The present invention refers to integrated circuit (IC) cards, and more particularly it relates to an integrated circuit card for a user terminal of a telecommunication system, which card is equipped with a transceiver module for performing wireless transactions independent of the telecommunication system, and to a user terminal including said card.

BACKGROUND OF THE INVENTION

Integrated circuit cards or smart cards, i.e. cards embodying an integrated circuit (chip) for the processing required by its specific use, are a widely diffuse means for storing information and performing transactions of different nature.

In telecommunication field, smart cards are used for instance in the so-called SIM (Subscriber Identity Module) of mobile terminals, or in the SIM evolution, named USIM (Universal SIM), for the 3rd generation terminals. For sake of simplicity, the term "SIM" will be used throughout the specification to indicate both the SIM and the USIM. The integrated circuit inside a SIM card is substantially a microcontroller, with memory areas for programs and data (in particular information characterising a user), and a processing unit entrusted with the execution of a number of security-related functions (such as user authentication and communication encryption).

There is an ever growing interest of telecommunication operators and industry in offering the customers of mobile networks the possibility of using their terminals for a variety of applications and in a variety of environments, besides the conventional communication functions. Some of such applications entail associating the SIM card of the terminal with transceivers allowing use of the terminal for radio communications which do not pass through the mobile network, for instance for financial transactions, electronic tag writing/reading and so on. Examples of SIM cards used both for mobile communications and for other wireless transactions are disclosed in EP 0 820 178 A and WO 01/80193 A.

The association of the SIM card of a user terminal with a transceiver for Personal Area Network (PAN) applications may be of particular interest. Such transceivers are devices that can be strongly miniaturised and that offer the possibility of enabling new value added services, and therefore they are suitable for cooperation with a SIM card. Examples of transceivers of this kind are those using the Bluetooth™ technology, whose characteristics are disclosed in IEEE Standard 802.15.1. Those transceivers allow create short range, dynamically varying networks, each capable of communicating with an adjacent network of the same kind to provide a wider coverage.

An example of this association is disclosed in WO-01/95605. The document disclose a system including a SIM module with a conventional GSM SIM card connected to a Bluetooth™ slave unit, and a GSM terminal including a Bluetooth™ master unit. Communication of the SIM with the terminal takes place through the Bluetooth™ units.

Another technology for implementing PANs is the ZigBee™ technology, whose features are disclosed in the homonymous standards. The physical and MAC (Medium Access Control) level of a ZigBee™ protocol is disclosed also in IEEE Standard 802.15.4.

Whatever the kind of transceiver to be associated with a SIM card to obtain a multi-function SIM card providing the user terminal with new capabilities, the prior art solutions propose an at least partial integration of the new functions and the conventional SIM functions on a same ad hoc chip, in order to reduce the costs of the multi-function SIM card (see for instance the aforementioned EP 0 820 178 A and WO 01/80193 A). However, as long as the new multi-function terminals have not attained such a wide diffusion that the development costs of the new chips are justified, it would be more convenient to maintain the existing SIM chips and transceiver chips also in the multi-function SIM cards.

The prior art has failed to address this problem and it does not provide any teaching on how the terminal, the conventional SIM chip and a transceiver added to the SIM card can be made to communicate in order to integrate the new and old functions in the mobile equipment.

Thus, it is an object of the present invention to provide a joint SIM card and wireless transceiver module for a user terminal of a telecommunication system, in which the same chips as would conventionally be used for non-joint SIM cards and transceivers can still be used.

SUMMARY OF THE INVENTION

The invention provides an integrated circuit card for a user terminal, equipped with a first functional unit allowing operation of said terminal in a telecommunication system, and with a second functional unit performing the functions of a radio transceiver allowing execution of wireless transactions independent of said telecommunication system. The first and second functional units are made as independent units and are interconnected by a third functional unit, also made as an independent unit, establishing connection between said first and second functional units and said terminal.

Advantageously, the third functional unit is an arbitrating unit, implemented by a finite state machine, arranged to allow a direct communication between said first and second functional units or between said second functional unit and said terminal, besides the communication between said first functional unit and said terminal required by the operation of the terminal within the telecommunication system.

Each functional unit can be either a chip or chip set, or the whole of IC library blocks implementing the specific function (for example, the SIM function, the transceiver function or the arbitrating function).

Preferably, the transceiver is a transceiver for personal area network applications, more preferably a transceiver based on the ZigBee™ technology, and is embodied into the SIM (or USIM) card of a mobile terminal.

The invention also concerns a user terminal including such an IC card.

By providing an additional chip through which an IC card chip and a transceiver have access to card contacts for communicating with a terminal, existing chips can be used for both the IC card chip (e.g., SIM) and the transceiver, and manufacturers will not be compelled to develop new designs and new layouts for an ad hoc IC card chip and transceiver chip until this will become economically viable. The same advantages are achieved when the functional units are independent library blocks that can be implemented in a same chip. Moreover, with the proposed structure, each of the functions provided on the IC card can be independently upgraded, while leaving the interface towards the terminal unchanged.

BRIEF DESCRIPTION OF THE DRAWINGS

Further objects, characteristics and advantages of the invention will become apparent from the following description of preferred embodiments, given by way of non-limiting example and illustrated in the accompanying drawings, in which:

FIG. 3 is a block diagram of the finite state machine interconnecting the SIM chip and transceiver module;

FIGS. 6 and 7 are diagrams illustrating the generation of the requests for access by the terminal to the SIM unit or the transceiver.

DESCRIPTION OF THE PREFERRED EMBODIMENTS

The invention will now be described in greater detail assuming, by way of non-limiting example, that the transceiver to be mounted on the SIM card is a ZigBee™ transceiver. ZigBee™ devices are of particular interest due to their features of low energy consumption and to their capability of self-reconfiguration into an ad hoc network, allowing an indirect information transfer from one network node (i.e. a transceiver) to another one. Such features, jointly to the possibility of integrating both the analogue transmission function and the whole communication protocol onto the same chip, make more and more interesting the application of such components within existing devices such as the SIM cards.

Figure 1:
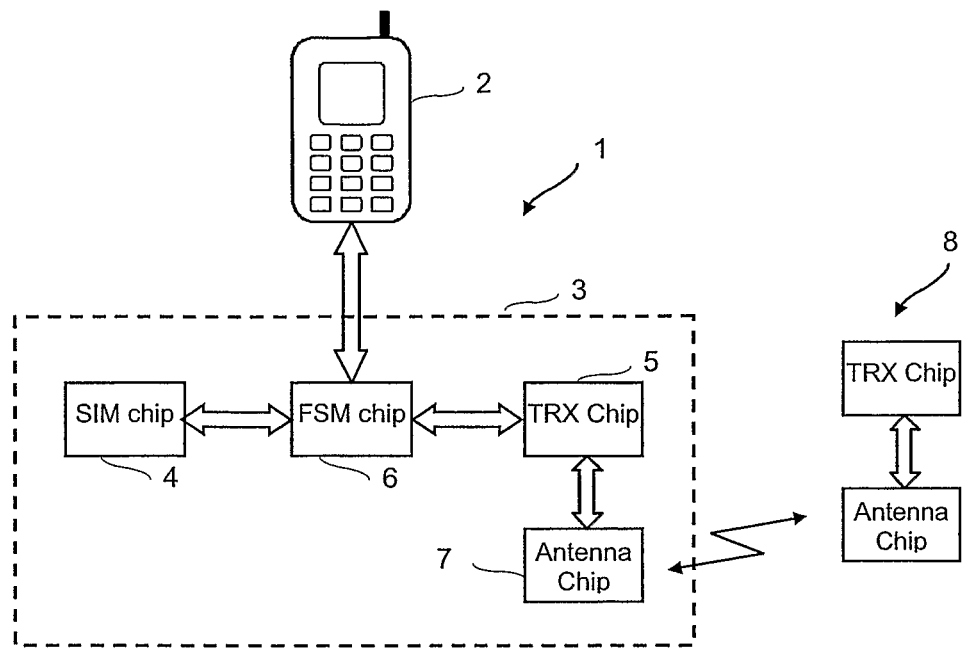
FIG. 1 shows a mobile terminal with a SIM card bearing a single-chip transceiver for PAN applications.

Referring to FIG. 1, a telecommunication equipment, generally shown at 1, includes a terminal 2, e.g. a cellular phone, equipped with a SIM card 3, which, according to the invention, is to perform both the functions of a standard SIM and of a ZigBee™ transceiver. For sake of clarity, SIM card 3 is shown separated from telephone 2 and is greatly enlarged.

SIM card 3 is equipped with SIM chip 4 performing the standard SIM functions (substantially, user identification, security, encryption, services provided by the operator . . . ), and a ZigBee™ transceiver module 5 associated with a radiating element (chip or printed antenna) 7. Hereinafter, when necessary, reference will be made, by way of non-limiting example, to a transceiver and an antenna operating at 2.45 GHz.

In this embodiment, transceiver 5 is a single chip including the whole protocol stack, from the physical layer to the networking and application functions.

Figure 2:
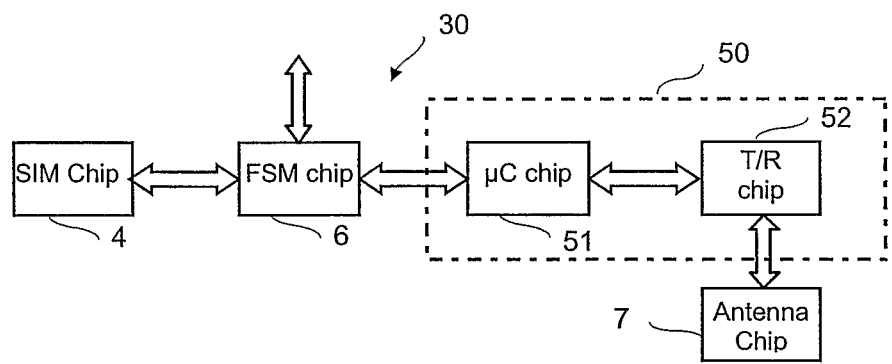
FIG. 2 is a block diagram of a SIM card bearing a two-chip transceiver.

In an alternative embodiment, shown in FIG. 2, the SIM card 30 could be equipped with a ZigBee™ transceiver 50 made of two chips 51, 52. Chip 51 is a dedicated microcontroller including the software for the protocol implementation, and chip 52 in turn performs the reception-transmission functions, and includes also the analogue part of the ZigBee™ node.

Thanks to the presence of ZigBee™ transceiver chip 5 (50) and its antenna 7, the mobile terminal 2 can also be used as a transmitter-receiver for personal area network (PAN) applications and thus it can exchange information with further nodes of the PAN, one of which is shown at 8 in the drawing, without using the mobile network. A node like node 8 can then propagate the information received by terminal 2 to other nodes of the PAN, or can supply terminal 2 with information generated by other nodes of the PAN.

Also node 8 could be mounted on the SIM card of another terminal like terminal 2, so that two or more terminals equipped with SIM card 3 can use the ZigBee™ transceiver for PAN applications.

In a typical practical use of an equipment 1 having card 3, an application residing in mobile telephone 2 (e.g. a Java applet taken from a dedicated area of the site of mobile network operator) is authenticated through SIM 4 and uses ZigBee™ transceiver 5 (50) for activating value added services (for instance ad hoc gaming, information services such as tourist information services, etc.).

Both single chip and two-chip ZigBee™ transceivers are already commercially available. Examples are components from Chipcon, series CC2X20 for multi-chip systems (e.g. CC2420) together with Atmega AVR 128L microcontroller from Atmel, and series CC2X30 for single chip transceivers. Another component for transceiver modules could be EM2420 from Ember Corporation.

A component suitable for antenna 7 is component "tiny ANT-2.45-CHP" of Linx Technologies, which is substantially a printed antenna.

To allow using the already existing chips for the SIM and the transceiver functions, respectively, without need for a full custom redesign as would be requested by use of an ad hoc chip integrating at least in part both functions, SIM card 3 is further equipped with a module 6, consisting of a finite state machine (FSM), which will provide access by the SIM and transceiver chip 5, or transceiver control chip 51, to the card contacts.

FSM module 6 guarantees the standard communication between SIM 4 and telephone 1 and manages the interoperability of telephone 2 and SIM 4 with ZigBee™ transceiver 5 (50), as will be discussed below.

The general structure of FSM module 6 is shown in FIG. 3. FSM module 6 comprises a logic unit 10 performing the core functions of the FSM, and interfaces 11, 12 and 13 connecting the FSM to the different units of equipment 1 among which communication is to be allowed.

More particularly, interfaces 11, 12 connect FSM module 6 with mobile telephone 2 and SIM chip 4, respectively, and guarantee the conventional use of SIM 4 by telephone 2. They may be for instance interfaces compliant to ISO standard 7816.

Interface 13 connects FSM module 6 with transceiver module 5 (50), and it can be for instance of the SPI (Serial Peripheral Interface) type. Interfaces 13 and 11 (or 12, respectively) allow FSM module 6 to set up a direct communication between transceiver module 5 (50) and terminal 2 or between transceiver module 5 (50) and SIM chip 4, respectively.

The capability of a direct communication between transceiver 5 (50) and SIM chip 4 can be exploited for managing the security issues relating to communications of transceiver 5 (50), for instance for encryption key exchange. Such a direct connection allows keeping all security functions in SIM chip 3.

Core unit 10 manages the communications, through the proper interfaces, between the various units connected to FSM module 6 by assigning different priorities to the different communications, and arbitrates, based on said priorities, concurrent communication requests. More particularly, the maximum priority will be allotted to the communication between terminal 2 and SIM chip 4, that is to the standard operation of mobile terminal 2.

Figure 4:
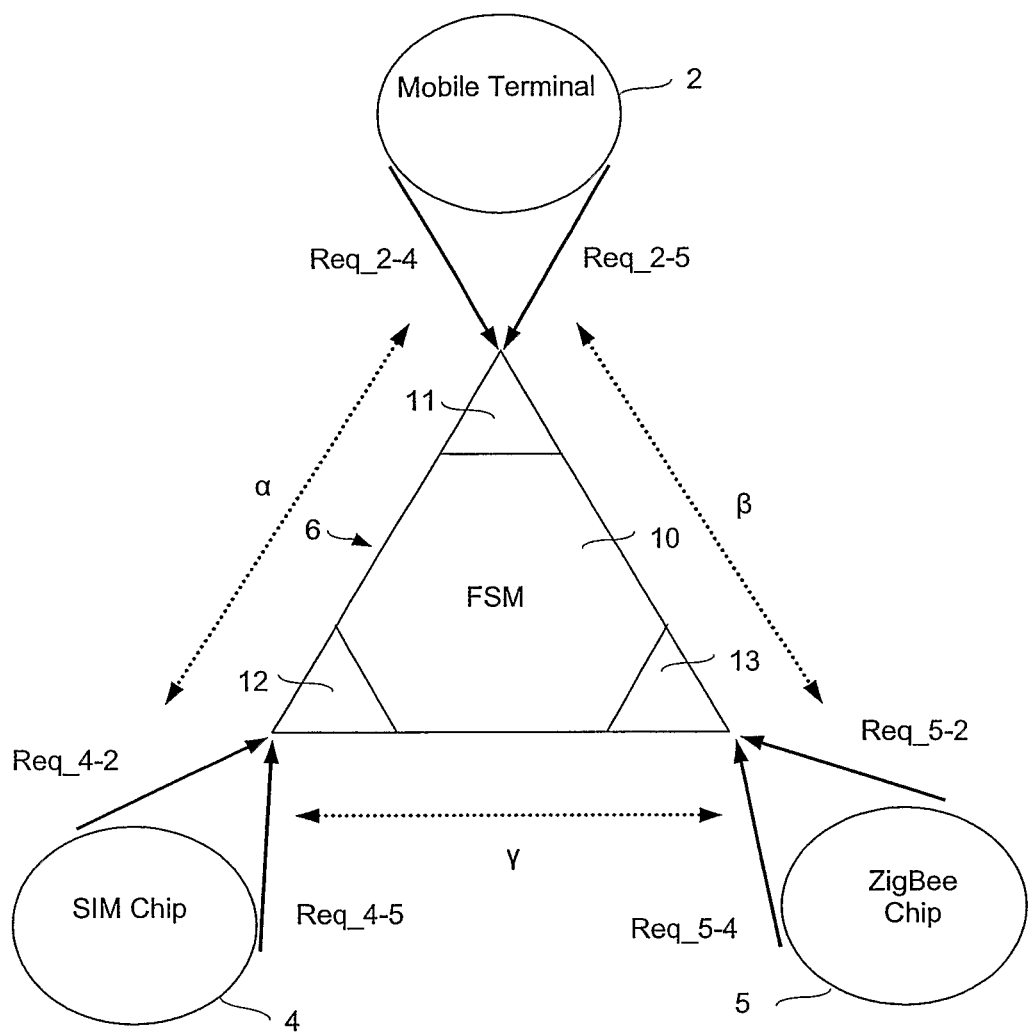
FIG. 4 is a graphical representation of the communications that can be set up among the SIM unit, the transceiver unit and the terminal through the finite state machine.

The different communication possibilities are graphically shown in FIG. 4, considering for instance the embodiment of SIM card shown in FIG. 1. The same references as used in FIGS. 1 and 3 are used also in this Figure.

Symbols α, β, γ denote the links for communication between mobile terminal 2 and SIM 4, between mobile terminal 2 and transceiver 5, and between SIM 4 and transceiver 5, respectively. Those links correspond to logical connections set up through the pins of the various chips and the contacts of the SIM card.

As said, the three links are allotted respective different priorities, the highest priority being allotted to links α and the lowest to links β.

Maintaining the conventional functions of mobile equipment 1 is of course the most important issue: that is why the highest priority is allotted to links α. The second rank is allotted to links γ, in order to permit security key exchange between SIM 4 and transceiver 5 before any communication involving the transceiver. Lastly, the communication between transceiver 5 and the application residing in terminal 2 is allotted the lowest priority: such a communication can be stopped and resumed, and the data from a radio link interesting transceiver 5 can be buffered and recovered.

Arrows Req_x-y (x, y=2, 4, 5) indicate the access requests by any of units 2, 4 and 5 to another unit, which requests will be interpreted by FSM core unit 10 that will set up the proper connections.

Let us consider in particular the communications between terminal 2 and SIM chip 4 upon occurrence of a standard "telephone" event, such as a telephone call or an SMS. If no communication is in progress between SIM chip 4 and transceiver chip 5 or between transceiver chip 5 and terminal 2 when the telephone event occurs, terminal 2 will directly access SIM chip 4 through interfaces 11 and 12. However, transceiver 5, if it is operating within the PAN, can continue its current operation (for instance, a communication with node 8) and will make available any processing result to mobile terminal 2 as soon as unit 10 will authorise this.

If a communication between SIM chip 4 and transceiver 5 is in progress when the standard "telephone" event occurs, unit 10 will stop it, will "freeze" the corresponding states for later resumption of the communication and will connect terminal 2 and SIM chip 4 as before.

Lastly, if mobile terminal 2 is executing an application using transceiver 5, the same application will postpone the ongoing process. After reception of the corresponding request, unit 10 will set up the direct connection between terminal 2 and SIM chip 4 and will resume the "frozen" transceiver application when the telephone event has ended.

Figure 5:
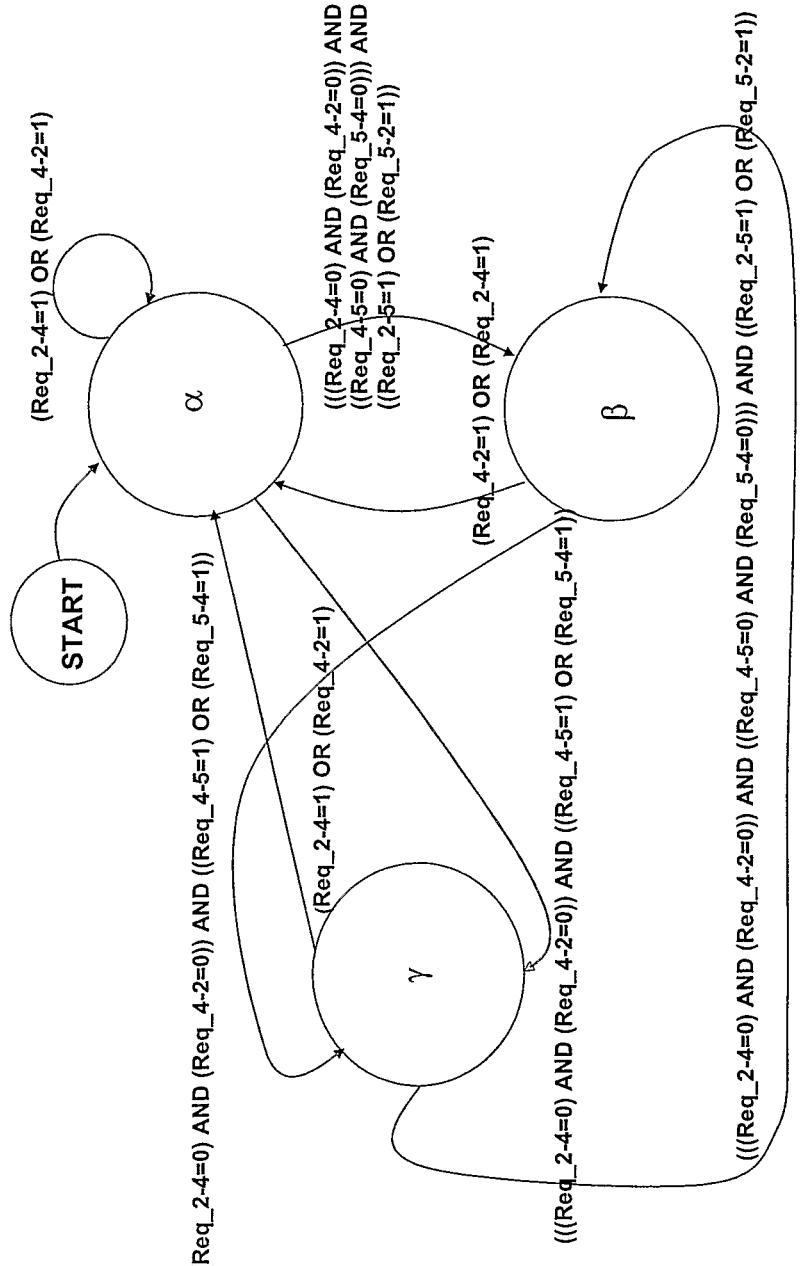
FIG. 5 is a state diagram of the operation of the finite state machine.

The above described operation of core unit 10 of FSM 6 is shown also in the state diagram of FIG. 5, where the three states α, β, γ correspond to the homonymous links in FIG. 4. Also the requests causing state transitions are indicated by the same symbols as used in FIG. 3.

In FIG. 5; in an initialisation phase (corresponding to the turning on of equipment 1) FSM core unit 10 starts from a state START that is immediately left to pass to state a in which telephone 2 is connected to SIM chip 4. In such a way, equipment 1 is ready for its conventional operation in the mobile communication system. If a request for communication between telephone 2 and SIM chip 4 arrives (Req_2-4 or Req_4-2=1), FSM module 6 remains in the same state.

If no request for communication between the telephone and the SIM is present (Req_2-4 and Req_4-2=0) and a request for a connection of type β (Req_2-5 or Req_5-2=1) or γ arrives (Req_4-5 or Req_5-4=1), FSM passes to the corresponding state.

Any request arriving while FSM module 6 is in state β or γ is handled by taking into account the above mentioned priorities.

So, should Req_2-4 or Req_4-2 become 1 while FSM is in either state above, FSM suspends the operation in progress and passes immediately to state α. Similarly, if Req_4-5 or Req_5-4 becomes 1 while FSM module 6 is in state β, a transition from state β to state γ takes place. A transition from state γ to state β is possible only if the corresponding request (Req_2-5 or Req_5-2=1) arrives in the absence of requests for communications of type α or γ.

The operations shown in FIGS. 4 and 5 are identical if transceiver module 50 of FIG. 2 is considered in place of transceiver module 5 of FIG. 1. In such case, any reference to unit 5 is to be replaced by a reference to unit 51.

For the generation of the request signals, the mechanism shown in FIGS. 6 and 7 can be adopted.

FSM core unit 10 comprises a request generation logic 14 arranged to interpret the instructions present in reception buffer 15 of the concerned interface and to generate requests Req_x-y (x, y=2, 4, 5).

For instance, in case of information arriving from telephone 2, to distinguish information directed to SIM chip 4 from that directed to transceiver 5 (50), it is possible to use, for the latter, APDUs (Application Protocol Data Units) that are not used by ISO standard 7816 and that are identified, according to the standard, by RFU (Reserved for Future Use) intervals. For instance, as shown in FIG. 7, request generation logic 14 reads the proper bytes from APDU header APDU-H and, by using e.g. a look-up table 16, generates a request of the kind Req_2-4 if the APDU belongs to the set concerning the SIM or a request of the kind Req_2-5 if the APDU does not belongs to such a set.

An alternative mechanism could make use of standard APDUs for reading from or writing into memory areas in SIM chip 4, or of APDUs that do not belong to the SIM addressing space. Request generation logic 14 could interpret that information to output Req_2-4/4-2 or Req_2-5/4-5, respectively.

A similar mechanism of APDU recognition can be used for information coming from SIM chip 3 and the reception buffer of interface 12.

As to transceiver chip 5, interface 13 is typically a serial interface (SPI): directing information to telephone 2 or to SIM chip 4 requires use of a suitable serial protocol (e.g. protocol APDU could be emulated).

The request generation mechanism described above could be dynamically managed if FSM module 6 is made reconfigurable. In such case, the APDUs reserved to transceiver module 5 (50) could be varied depending on the requirements. In the alternative, the memory address associated to the reading/writing APDU could be reconfigured, if this technique for access to the transceiver is used.

Figure 8:
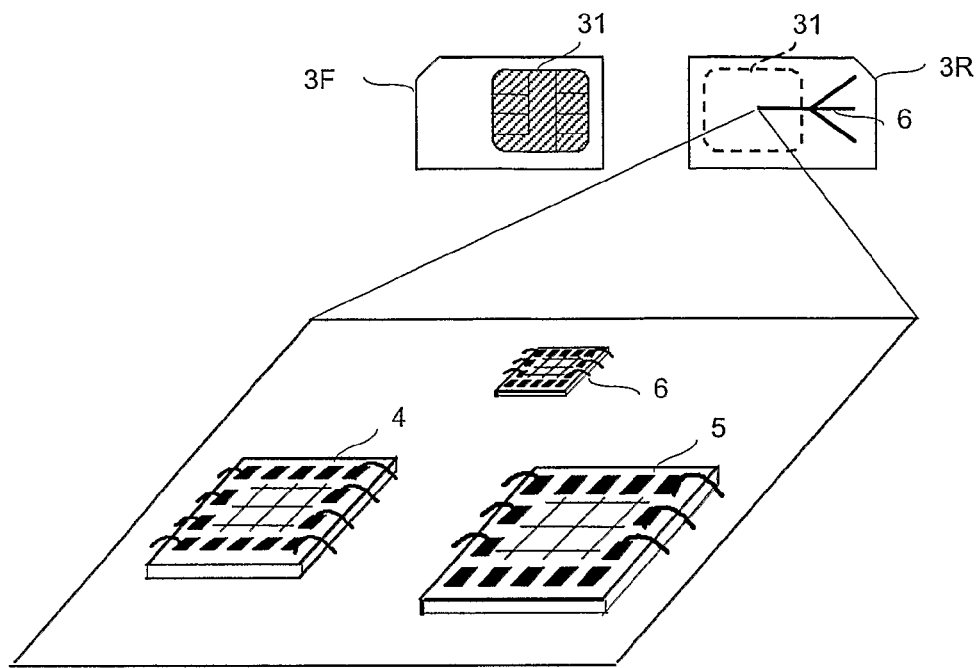
FIGS. 8 and 9 are schematic diagrams showing the chip mounting on the card, for the embodiments of FIGS. 1 and 2, respectively.
Figure 9:
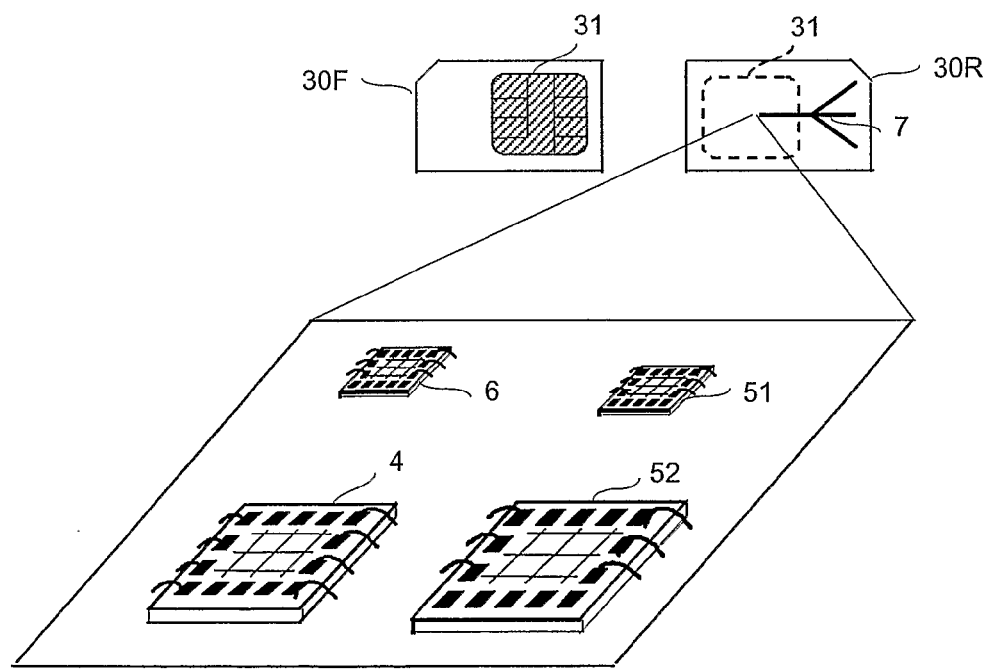

Some considerations about the SIM card manufacturing will now follow. Reference is made also to FIGS. 8 and 9, which relate to the embodiments of FIGS. 1 and 2, respectively. Here, the front (contact) side and the rear side of cards 3, 30 are denoted by 3F, 30F or 3R, 30R, respectively. Reference 31 denotes the card contacts, whose trace is shown in dashed line on the rear side of the card.

The present conventional SIM cards includes a single, full custom chip corresponding to chip 4, of which the I/O pins are interconnected with contacts 31. As said before, reuse of said chip and of the transceiver chip(s), without any modification, is made possible by FSM chip 6, which provides access to the I/O contacts of the SIM card. More particularly, both SIM chip 4 and transceiver chip 5 (or chips 51, 52) will communicate with terminal 2 through the conventional I/O contact (interface T=0 or T=1).

To allow this, SIM chip 4, transceiver chip 5 (or chips 51, 52) and FSM chip 6 can be manufactured by using the multi-chip module technique and the multi-chip module can be located under contacts 31.

No size problem exists in this respect. Actually, the area of chip 4 is about 6.25 mm² (2.5×2.5 mm) and the area of chip 6 is less than 1 mm²; as to the transceiver, the area of a commercially available single-chip transceiver is about 9 mm² (3×3 mm), and the areas of commercially available chips acting as chips 51 and 52 are about 7 mm² and less than 1 mm²; respectively.

This allows card 3 or 30 to maintain its standard size (e.g., plug-in size) and shape notwithstanding the additional functions, so that card 3 or 30 can actually be introduced in a mobile terminal in place of the conventional SIM card.

As to radiating element 7, the above mentioned component is essentially a printed antenna that can be formed on rear card plane 3R (30R), that is on the side opposite to the contact plane, in such a manner that the radiator is exposed at the card surface.

An important issue to be taken into account in integrating the ZigBee™ transceiver into a SIM card is the lower limit of the current to be delivered by terminal 2 to the SIM itself. According to the present SIM standards, the mobile terminal must supply the SIM, when necessary, with a current exceeding certain pre-set values so as to ensure the proper SIM operation. Adding new functions to the SIM should not affect the conventional SIM operation, i.e., no situation should occur in which the current demand by the multi-function SIM exceeds the maximum currents delivered by the terminal.

The currents that can be delivered by a standard terminal are reported in the following table 1 for different power supply conditions.

TABLE 1

| REFERENCE VOLTAGE | CURRENT TO BE SUPPLIED |
|---|---|
| 5 V | 60 mA |
| 3.3 V | 50 mA |
| 1.8 V | 30 mA |

Now, it is to be appreciated that:
the typical current consumption $I_{SIM}$ of a SIM is 7-8 mA, and is below 130 µA in sleep mode;
a typical ZigBee™ transceiver, according to the today's technology, has a current consumption $I_Z$ below 20 mA while transmitting and receiving, and below 30 µA in sleep mode (note that such values are not yet optimised and could be lower for new generation transceivers).

Clearly, in all cases reported in FIG. 3 the maximum current $I_{MAX}$ that can be delivered by the terminal always meets the condition $I_{MAX} > I_{SIM} + I_Z$ and thus there is a current margin compatible with the proposed integration of the ZigBee™ module onto a SIM card.

It is evident that the above description has been given by way of non-limiting example and that changes and modifications are possible without departing from the scope of the invention.

In particular, even if the detailed description and the drawings refer to separate chips for implementing the SIM standard functions, the transceiver module and the finite state machine, the skilled in the art will appreciate that the respective functions can be implemented by independent IC library blocks, which can be embodied into a single chip.

Further, the invention has been disclosed with particular reference to the integration of a ZigBee™ transceiver on the SIM card: yet, the transceiver could be a different transceiver for Personal Area Network applications, e.g. a Bluetooth™ transceiver.

Moreover, in general, the invention can be used not only with mobile terminals, but with any user terminal equipped with a SIM card, and whenever the SIM card of such a terminal is to be equipped with an integrated circuit radio transceiver for other kinds of wireless communications which do not make use of the telecommunication network, for instance a transceiver for monetary transactions, e-tag reading/writing, etc.

The invention claimed is:

1. An integrated circuit card for a user terminal, said integrated circuit card comprising:
a first functional unit allowing operation of said user terminal in a telecommunication system;
a second functional unit performing the functions of a radio transceiver allowing wireless functionalities independent of said telecommunication system; and
a third functional unit that interconnects said first and second functional units and establishes a connection between said first and second functional units and said user terminal; said first, second and third functional units being made as independent units, wherein said third functional unit provides communication interoperability between said first and second functional units,
wherein said third functional unit is an arbitrating unit arranged to allow a direct communication between said first and second functional units or between said second functional unit and said user terminal.

2. The integrated circuit card as claimed in claim 1, wherein said third functional unit is arranged to allot different priorities to the communications between said first functional unit and said user terminal, between said first functional unit and said second functional unit or between said second functional unit and said user terminal, the highest priority being allotted to the communications between said first functional unit and said user terminal and the lowest priority being allotted to the communications between said second functional unit and said user terminal.

3. The integrated circuit card as claimed in claim 2, wherein said third functional unit comprises a core unit, performing, based on said priorities, communication management and arbitration among concurrent communication requests, and first, second and third interfaces for connection to said user terminal, said first functional unit and said second functional unit, respectively, said core unit comprising a request generation circuit arranged to generate access requests to any one among said user terminal, said first functional unit and said second functional unit, based on an analysis of instructions read from reception buffers of said interfaces.

4. The integrated circuit card as claimed in claim 3, wherein said request generation circuit is arranged to recognise from the contents of predetermined fields of the instructions, whether or not an instruction is defined by a standard for communication between said user terminal and said first functional unit, and wherein said request generation circuit comprises a look-up table associating such contents with an instruction destination address, and outputting said destination address as an access request to said user terminal or said first functional unit if the instruction is defined by the standard, or to said second functional unit, if the instruction is not defined by the standard.

5. The integrated circuit card as claimed in claim 3, wherein said request generation circuit is arranged to recognise, from the contents of predetermined fields of the instructions, whether an instruction is a writing/reading instruction into/from a memory area of said first functional unit or an instruction not belonging to an addressing area of said first functional unit, and to generate an access request to said user terminal or said first functional unit in the former case, or to said second functional unit in the latter case.

6. The integrated circuit card as claimed in claim 1, wherein said third functional unit is a finite state machine.

7. The integrated circuit card as claimed in claim 6, wherein said finite state machine is reconfigurable.

8. The integrated circuit card as claimed in claim 1, wherein said first, second and third functional units are made as a multi-chip module, and the chips of said first and second functional units have access to contacts of said card through the chip of said third functional unit.

9. The integrated circuit card as claimed in claim 8, wherein said multi-chip module is located under the card contacts.

10. The integrated circuit card as claimed in claim 8, wherein said second functional unit is made of a single chip comprising a radio-frequency part of the transceiver and a whole protocol stack, from a physical layer to the networking and application functions, of a communication according to ZigBee™ standard.

11. The integrated circuit card as claimed in claim 8, wherein said second functional unit comprises a microcontroller chip for communication protocol implementation and a reception-transmission chip comprising a radio-frequency part of the transceiver.

12. The integrated circuit card as claimed in claim 1, wherein said first, second and third functional units are made of separate library blocks embodied into a single chip.

13. The integrated circuit card as claimed in claim 1, comprising a card performing identification and security-related functions for said user terminal.

14. The integrated circuit card as claimed in claim 13, comprising a subscriber identity module or a universal subscriber identity module card of a mobile terminal.

15. The integrated circuit card as claimed in claim 1, wherein said second functional unit is a transceiver for personal area network applications.

16. The integrated circuit card as claimed in claim 15, wherein said second functional unit is a transceiver according to ZigBee™ standard.

17. The integrated circuit card as claimed in claim 16, wherein said second functional unit comprises a microcontroller chip for communication protocol implementation and a reception-transmission chip comprising a radio-frequency port of the transceiver.

18. The integrated circuit card as claimed in claim 15, wherein said second functional unit is associated with a printed radiating element.

19. The integrated circuit card as claimed in claim 18, wherein said printed radiating element is formed on a card surface opposite to the surface bearing the card contacts.

20. Mobile communication equipment comprising the integrated circuit card as claimed in claim 18, wherein said second functional unit is a transceiver module for personal area network applications.

21. A multi-function communication terminal for operation both as a user terminal in a telecommunication system and as a terminal for performing wireless functionalities independently of said telecommunication system, the multi-function communication terminal comprising:
    an integrated circuit card including
        a first functional unit allowing operation of the equipment in said telecommunication system,
        a second functional unit performing the functions of a radio transceiver allowing said wireless functionalities, and
        a third functional unit establishing a connection of said first and second functional units with each other and with electronic circuitry in the multi-function communication terminal; said first, second and third functional units being made as independent units, wherein said third functional unit provides communication interoperability between said first and second functional units,
    wherein said third functional unit is an arbitrating unit arranged to allow a direct communication between said first and second functional units or between said second functional unit and said multi-function communication terminal.

22. The multi-function communication terminal as claimed in claim 21, wherein said integrated circuit card is a card performing identification and security-related functions for said user terminal.

23. The multi-function communication terminal as claimed in claim 22, wherein said integrated circuit card comprises a subscriber identity module or a universal subscriber identity module card of a mobile terminal.

24. A mobile communication terminal comprising a multi-function communication terminal as claimed in claim 21, wherein said second functional unit is a transceiver of a ZigBee™ node.

* * * * *